United States Patent
Nagayama et al.

(10) Patent No.: US 8,264,755 B2
(45) Date of Patent: Sep. 11, 2012

(54) IMAGE FORMING APPARATUS AND IMAGE FORMING METHOD

(75) Inventors: Katsuhiro Nagayama, Osaka (JP); Takashi Kitagawa, Osaka (JP); Masayuki Otsuka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 798 days.

(21) Appl. No.: 12/436,446

(22) Filed: May 6, 2009

(65) Prior Publication Data

US 2009/0284770 A1    Nov. 19, 2009

(30) Foreign Application Priority Data

May 14, 2008 (JP) ................................ 2008-127095

(51) Int. Cl.
G03F 3/08 (2006.01)
(52) U.S. Cl. ......... 358/518; 358/1.9; 358/1.13; 358/1.2; 358/504; 399/72; 347/19; 382/167
(58) Field of Classification Search ............. 358/1.9, 358/1.2, 1.13, 504, 518; 399/72; 347/19; 382/167
See application file for complete search history.

(56) References Cited

U.S. PATENT DOCUMENTS 6,215,968 B1    4/2001    Uehara et al.

FOREIGN PATENT DOCUMENTS

| EP | 2107427 A1 * | 3/2009 |
|---|---|---|
| JP | 2001-13748 A | 1/2001 |
| JP | 2002-296861 A | 10/2002 |
| JP | 2006-259442 A | 9/2006 |
| JP | 2008-181534 A | 7/2008 |
| JP | 2008-197564 A | 8/2008 |

* cited by examiner

*Primary Examiner* — King Poon
*Assistant Examiner* — Jamares Q Washington
(74) *Attorney, Agent, or Firm* — Birch, Stewart, Kolasch & Birch, LLP

(57) ABSTRACT

An image forming apparatus including: a black image forming section for forming a black image and a first black pattern for a coarse correction of black and optionally a second black pattern for a precise correction of black; a color image forming section for forming a color image optionally a third pattern for a coarse correction of color and optionally a fourth pattern for a precise correction of color; and a control section for allowing at least the first black pattern to be formed and optionally a second black pattern and third and fourth color patterns, and controlling to perform the coarse correction of black for correcting a forming condition of a black image to be formed and to perform optionally a precise correction of black, the coarse and precise correction of color based on the measurement of the formed pattern(s), wherein the control section controls to perform the coarse correction of black but not to perform the precise correction of black and the coarse and precise corrections of color in case a print job is acquired after a predetermined period elapses since the black image forming section has formed the first black pattern previously and the acquired print job includes a black-and-white page only.

9 Claims, 6 Drawing Sheets

IMAGE FORMING APPARATUS AND IMAGE FORMING METHOD

CROSS-REFERENCE TO RELATED APPLICATION

This application is related to Japanese Patent Application No. 2008-127095 filed on May 14, 2008, whose priority is claimed and the disclosure of which is incorporated by reference in its entirety.

BACKGROUND OF THE INVENTION

1. Field of the Invention

The present invention relates to an image forming apparatus and an image forming method. More specifically, the present invention relates to an electrophotographic type or electrostatic type image forming apparatus, such as a copier, facsimile, printer, and so-called digital multifunction peripheral, and an image forming method, and more particularly to a determination as to whether an image adjusting operation is executed or not in a color image forming apparatus.

2. Description of the Related Art

There have been known color image forming apparatuses that print and output the result, which has been subject to various image forming processes, based upon externally received image data or image data obtained by reading a document. Of these color image forming apparatuses, a so-called multifunction peripheral (MFP) having not only a basic function such as a printer function, a scanner function, a facsimile function, a copy function, etc., but also various functions utilizing a network communication becomes widespread.

Since, in a color image forming apparatus, an image quality varies depending upon the difference in the environment where the apparatus is used, such as a temperature or humidity, or a printed document, an image adjusting operation (also referred to as a process control or image correction) is periodically executed.

There has been known a color image forming apparatus that avoids a control operation of image forming operations by which an image forming condition greatly varies, and executes a first control and a second control in order to prevent a color phase of a color image from varying (see, for example, Japanese Unexamined Patent Application No. 2006-259442). In this apparatus, the first control controls a change value of an exposure amount so as to fall within a predetermined range, while in the second control, correction values of exposure amounts of image exposure means corresponding to plural colors are calculated respectively, and the exposure amount of exposure means is controlled based upon the calculated values.

Although the periodic execution of the image adjusting operation is excellent in stably maintaining a printed image, this operation is very unfavorable for a user who has to be in a hurry, since this adjusting operation needs several ten seconds to several minutes. For the image adjustment, a pattern for the image adjustment is formed on a photoconductor by using a developer (toner), so that some amounts of developer (toner) are consumed. Therefore, the apparatus has a drawback that the amount of developer (toner) that can be used for an actual print job is reduced.

In view of this, a color image forming apparatus performing a high image density correction and a halftone density correction has been proposed in which the previous result and the result this time in the high image density correction are compared, and only when the difference becomes not less than a difference reference value set beforehand, the halftone density correction is executed (see, for example, Japanese Unexamined Patent Application No. 2001-13748).

A color image forming apparatus also has a function of forming an image in black and white. A color image forming apparatus generally includes image forming sections for forming images of color components of yellow (Y), magenta (M), cyan (C), and black (K), wherein the images of Y, M, C, and K formed at the respective image forming sections are superimposed. On the contrary, it is unnecessary to form images other than the K color component in a black-and-white image, so that the image forming sections of Y, M, and C are not operated. Accordingly, the image adjustment for the Y, M, and C does not have to be performed for the black-and-white printing. Since the image forming sections of Y, M, and C are not operated, the print cost for the black-and-white image is cheaper than the print cost for the color image. Therefore, the charging for a user involved with the printing is made independently for a color printing and a black-and-white printing.

Therefore, a user who carries out a black-and-white printing in most cases cannot allow extra time and cost caused by the image adjustment for Y, M, and C that is executed when a color printing is not performed. On the other hand, the ratio of the black-and-white printing and the color printing is different by each user. Further, the ratio may vary depending upon a period even by the same user.

SUMMARY OF THE INVENTION

The present invention is accomplished in view of the above-mentioned circumstance, and aims to provide an image forming apparatus and an image forming method that can perform only an image adjustment of a necessary type and precision, even when a ratio of a black-and-white printing and a color printing is different by a user or depending upon a period.

The present invention provides an image forming apparatus including: a job acquiring section for acquiring image data of one or more pages as a print job; a determining section for determining whether the acquired print job include a black and white page only or a color page; a black image forming section for forming a black image in the black-and-white page and/or a black image in the color page, and forming a first black pattern for a coarse correction of black and optionally a second black pattern for a precise correction of black; a color image forming section for forming a color image which includes different color components of the color page but excludes a black component and forming optionally a third pattern for a coarse correction of color and optionally a fourth pattern for a precise correction of color; a measuring section for measuring the formed pattern(s) including at least the first pattern; and a control section for allowing the black image forming section to form at least the first black pattern and optionally a second black pattern, allowing the color image forming section to form optionally third and/or fourth color pattern(s), allowing the measuring section to measure the formed pattern(s) including at least the first pattern, and controlling to perform the coarse correction of black for correcting a forming condition of a black image to be formed in a black-and-white page and to perform optionally a precise correction of black, the coarse and precise correction of color for correcting a forming condition of both black and color images to be formed in a color page based on the measurement of the formed pattern(s), wherein the control section controls to perform the coarse correction of black but not to perform the precise correction of black and the coarse and precise corrections of color in case a print job is acquired after a predetermined period referred as a first period elapses since the black image forming section has formed the first black pattern previously and the acquired print job includes a black-and-white page only.

From another aspect, the present invention provides an image forming method including the steps of: acquiring image data of one or more pages as a print job by a job acquiring section; determining, by a determining section, whether the acquired print job include a black and white only or a color page; forming a black image in the black-and-white page and/or a black image in the color page by a black image forming section; forming a color image which includes different color components of the color page but excludes a black component by a color image forming section; forming a first black pattern for a coarse correction of black and optionally a second black pattern for a precise correction of black by the black image forming section and forming optionally a third pattern for a coarse correction of color and optionally a fourth pattern for a precise correction of color by the color image forming section; measuring the formed pattern(s) including at least the first pattern by a measuring section; correcting a forming condition of the black image and/or respective color components of the color image by a control section; and controlling to perform the coarse correction of black for correcting a forming condition of a black image to be formed in a black-and-white page and to perform optionally a precise correction of black, the coarse and precise correction of color for correcting a forming condition of both black and color images to be formed in a color page based on the measurement of the formed pattern(s), wherein the step of controlling is a step of performing the coarse correction of black but not performing the precise correction of black and the coarse and precise corrections of color in case a print job is acquired after a predetermined period referred as a first period elapses since the black image forming section has formed the first black pattern previously and the acquired print job includes a black-and-white page only.

In the image forming apparatus according to the present invention, the control section simply corrects the black image forming condition in such a manner as (1) to form a black coarse correction pattern, (2) not to form a precise correction pattern, and (3) to cause the color image forming section not to form the pattern, when the determining section determines that a black coarse correction period reaches the first period that is predetermined based on the coarse correction of the black-and-white printing, and the job to be executed is the job including only the black-and-white image. Therefore, only an image adjustment of necessary type and precision can be performed, even if a user performs a black-and-white printing with a higher ratio than a color printing, or even if the ratio is changed depending upon a user or a period. Accordingly, extra time and extra toner that is supposed to be spent for the image adjustment of unnecessary type and/or precision can be saved. The image forming method according to the present invention provides the same effect.

DETAILED DESCRIPTION OF THE PREFERRED EMBODIMENTS

Figure 1:
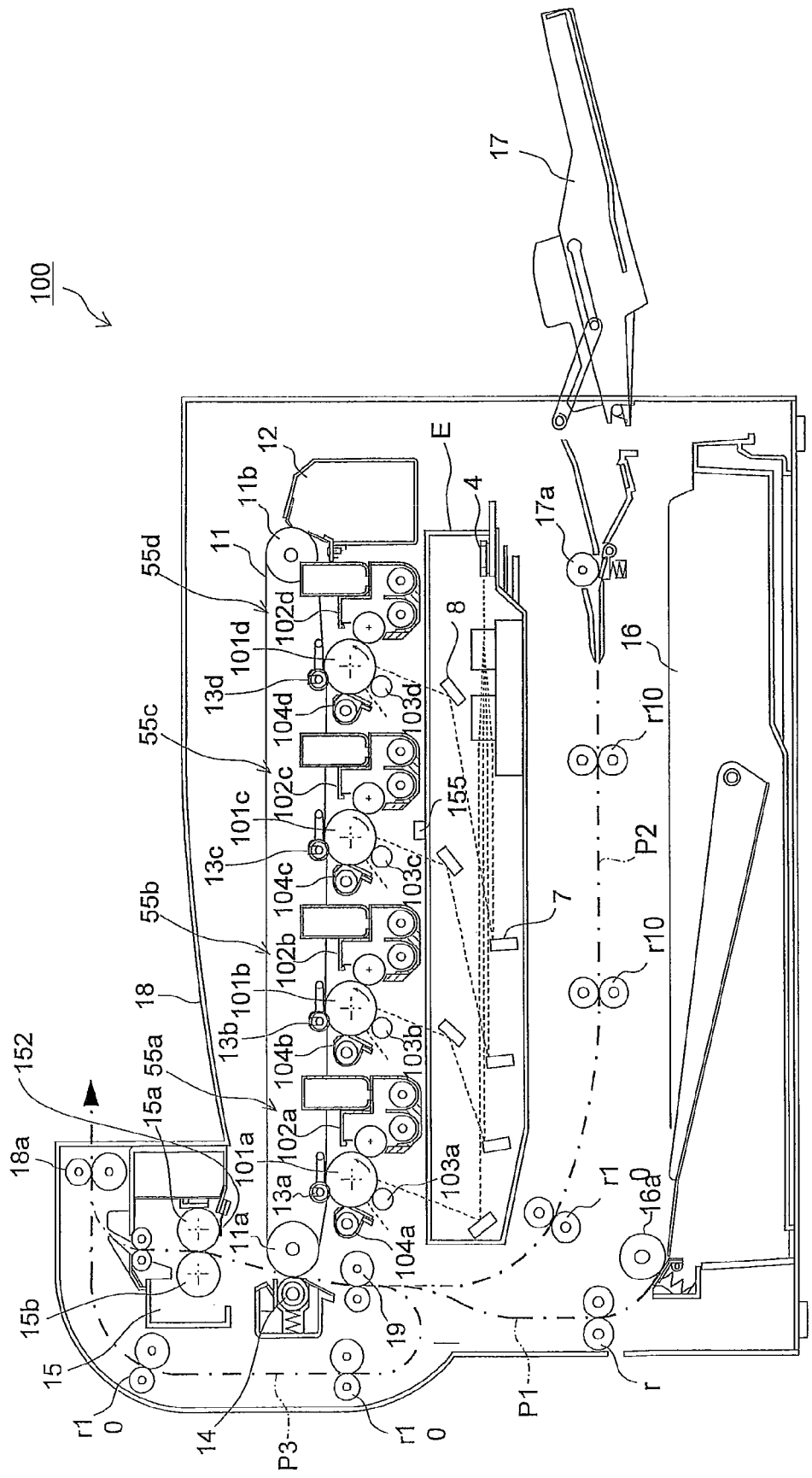
FIG. 1 is an explanatory view illustrating an example of an overall structure of a color image forming apparatus according to the present invention.

In the present invention, the job acquiring section acquires an externally received print job or acquires a print job by reading a document. The specific aspect thereof includes, for example, a reception circuit that externally receives print data via a communication line, and a reception control processed by a computer. A different example is a document reading device that reads a document and a transferring circuit that transfers the image data read by the document reading device. In the aspect described later, the job acquiring section corresponds to a communication processing section.

The determining section determines whether the acquired job is a job including only a black-and-white printing or a job including a color printing. Namely the determining section determines whether the acquired job includes a color page or not. The specific aspect thereof includes, for example, a process in which a computer (or a microcomputer, the same is true later) reads and determines a property of each page of a print job. In the aspect described later, the determining section corresponds to a CPU.

The black image forming section forms an image of a K-color component out of a black-and-white image and a color image according to an electrophotographic process. The color image forming section forms an image of each color component of Y, M, and C according to an electrophotographic process. In the aspect described later, the black image forming section and the color image forming section correspond to a photoconductor drum, a developing device, a charging roller, a cleaner unit, and a primary transfer roller, corresponding to each color.

The measuring section is a sensor that reads the image adjustment pattern formed by each image forming section, and a circuit involved with the sensor. The specific aspect of the sensor includes, for example, a reflective-type photo sensor. In the aspect described later, the measuring section corresponds to a reflection density sensor.

The control section determines the condition by which the image forming section performs the image formation based on the information of the image adjustment pattern read by the measuring section, such as a charging potential, a developing bias voltage, an area gradation pattern for expressing a gradation of each pixel, etc. The specific aspect thereof includes, for example, a circuit that controls the operation of the image forming section, an image processing circuit, and a process realized by the execution of a control program by a computer. In the aspect described later, the control section corresponds to an image quality adjusting section and image quality adjustment starting section.

An operation storage section may store the period during when the image forming section is operated, i.e., the history of the operation. The specific aspect thereof includes, for example, a timer that counts the rotating time of each photoconductor for an electrophotographic process, and a memory device that stores a cumulative value of the rotating time for each photoconductor. In the aspect described later, the operation storage section corresponds to a cumulative operation counter (second storage section). The rotating time of each photoconductor is one example of the history of the operation. The history of the operation may be a number of printed pages, a toner consumption, a dot counter value of a pixel with a density not less than a predetermined density, an operation time of a developing section in an electrophotographic process, etc.

The preferable aspects of the present invention will be described below.

The control section may control to selectively perform the coarse correction of black, the precise correction of black, the coarse correction of color or the precise correction of color, to correct density, the coarse correction of black being to correct a high density portion of the black image by forming and measuring the first black pattern, the precise correction of black being to correct a high density and halftone portion of the black image by forming and measuring the first and second black patterns, the coarse correction of color being to correct a high density portion of the color image by forming and measuring the third color pattern, and the precise correction of color being to correct a high density and halftone portion of the color image by forming and measuring the third and fourth color patterns. By virtue of this structure, the formation and measurement of the color adjustment pattern is unnecessary when the job to be executed is a black-and-white printing, while the formation and measurement of the precise pattern is unnecessary when the coarse correction is performed. On the contrary, when the color precise correction is performed, the coarse correction of color and the black-and-white image correction included therein are performed. Furthermore, when the coarse correction of color is performed, the black coarse correction included therein is performed. As described above, the color image correction and the black-and-white image correction, and the precise correction and the coarse correction are hierarchically formed, whereby it becomes unnecessary to spend extra time and consume extra toner for the formation and measurement of the pattern.

The control section may control to perform the precise correction of black but not to perform the coarse correction of black and the coarse and precise corrections of color in case a print job is acquired after a predetermined second period elapses since the black image forming section has formed the second black pattern previously and the acquired print job includes a black-and-white page only, and the second period may be a longer period than the first period. By virtue of this structure, when only the coarse correction for the black-and-white image is necessary, the density correction pattern in the halftone area and the patterns for the Y, M, and C, which are unnecessary for the coarse correction for the black-and-white printing, are not formed. Therefore, the time unnecessary for the formation and measurement of the patterns described above is not spent, and further, the toner unnecessary for the formation and measurement of the patterns described above is not consumed.

The image forming apparatus according to the present invention may further include: a black correction interval changing section that changes a length of the first and/or the second period. According to this aspect, the interval in which the black-and-white coarse image adjustment and/or the precise image adjustment are executed can be changed in accordance with the past record or a request by a user.

The control section may control to perform the coarse correction of color but not to perform the coarse and precise corrections of black and the precise correction of color in case a print job is acquired after a predetermined third period elapses since the color image forming section has formed the third color pattern previously and the acquired print job includes a color page. In general, the ratio of the black-and-white printing and the color printing are different by a user, and further, different depending upon a period. Therefore, the ratio is difficult to be predicted. According to this aspect, the period for executing the color image adjustment is determined separate from the black-and-white image adjustment, whereby the image adjustment is executed for the color image and the black-and-white image with the optimum interval. Accordingly, even if the ratio of the black-and-white printing and the color printing is changed, the color image and the black-and-white image can be maintained in a satisfactory condition.

The control section may control to perform the precise correction of color but not to perform the coarse and precise corrections of black and the coarse correction of color in case a print job is acquired after a predetermined fourth period elapses since the color image forming section has formed the fourth color pattern previously and the acquired print job includes a color page; and the fourth period may be a longer period than the third period. By virtue of this structure, a density in the high density area of the color image whose change in the image quality is noticeable is corrected by the coarse correction, while a density in the halftone area is corrected by the precise correction with the interval longer than the interval of the coarse correction. Therefore, the time and toner used for the formation and measurement of the pattern can be saved compared to the case where the precise correction is executed every time.

The image forming apparatus according to the present invention may further include: a color correction interval changing section that changes a length of the third and/or the fourth period. The ratio of the black-and-white printing and the color printing are different by a user, and further, different depending upon a period, as described above. Moreover, the color image quality, i.e., the allowable range for the variation in the image quality, is different depending upon a user, or depending upon an environment where the apparatus is installed. Therefore, the ratio is difficult to be predicted before the apparatus is used. According to this aspect, the interval for executing the black-and-white image adjustment can be set independent of the color image adjustment, whereby the optimum interval can be set respectively for the color image and the black-and-white image. Accordingly, even if the ratio of the black-and-white printing and the color printing is changed, the color image and the black-and-white image can be maintained in a satisfactory condition. The interval in which the coarse image adjustment and/or the precise image adjustment are executed can be changed in accordance with the past record or a request by a user, whereby the optimum period according to the condition can be set.

The first period may be determined based on an operation time of a corresponding photoconductor, or based on a cumulative number of black-and-white pages.

The various aspects described above can be combined with one another.

The present invention will be described in detail below with reference to the drawings. It should be understood that the following description is illustrative of the invention in all aspects, but not limitative of the invention.

<Mechanical Structure of Image Forming Apparatus>

An example of a structure of an image forming apparatus according to the present invention will be described with reference to the drawings. FIG. 1 is an explanatory view illustrating a mechanical overall structure of a color image forming apparatus according to the present invention.

A color image forming apparatus 100 prints a multi-color or black-and-white image on a predetermined sheet (recording sheet) based on image data included in an input command, such as image data externally transmitted through a communication network.

As shown in FIG. 1, the color image forming apparatus 100 according to the present embodiment includes an exposure unit E, photoconductor drum 101 (101a to 101d), developing device 102 (102a to 102d), charging roller 103 (103a to 103d), cleaner unit 104 (104a to 104d), intermediate transfer belt 11, primary transfer roller 13 (13a to 13d), secondary transfer roller 14, fuser 15, sheet transporting paths P1, P2, and P3, sheet feeding cassette 16, manual sheet feeding tray 17, and sheet exit tray 18. The exposure unit E exposes a peripheral surface of the photoconductor drum 101, which is uniformly charged by the charging roller 103, with a pattern in accordance with image data, so as to form an electrostatic latent image on the peripheral surface. The developing device 102 develops the electrostatic latent image with toner.

In the color image forming apparatus 100 according to the present embodiment, an image forming section 55 (55a to 55d) forms a visible image by using image data of a color image corresponding to the color phases of four colors of black (K), cyan (C), magenta (M), and yellow (Y). The image data corresponds to the color image using each color. Accordingly, the color image forming apparatus 100 is provided with four developing devices 102 (102a to 102d), four photoconductor drums 101 (101a to 101d), four charging rollers 103 (103a to 103d), and four cleaner units 104 (104a to 104d) in order to form four electrostatic latent images corresponding to the respective colors.

The image forming sections 55a to 55d have the same structure. For example, the black image forming section 55a includes the photoconductor drum 101a, the developing device 102a, the charging roller 103a, the transfer roller 13a, and the cleaner unit 104a. The image forming sections 55a to 55d are arranged in a line in the moving direction (sub-scanning direction) of the intermediate transfer belt 11. The sings "a" to "d" indicates such that "a" corresponds to black, "b" corresponds to cyan, "c" corresponds to magenta, and "d" corresponds to yellow. The means classified by these signs constitute four image stations. In the present embodiment, a temperature/humidity detecting sensor 155 that detects the atmospheric temperature or humidity in the color image forming apparatus 100 is mounted below the image forming sections 55a to 55d as shown in FIG. 1. The temperature/humidity detecting sensor 155 may be provided at other part in the apparatus so long as it can detect the atmospheric temperature and humidity in the apparatus.

The exposure unit E in the present embodiment includes an unillustrated semiconductor laser, a polygon mirror 4, a first reflection mirror 7, and a second reflection mirror 8. The exposure unit E emits light beams such as laser beams, which are modulated by the image data of the respective color phases of black, cyan, magenta, and yellow, to the corresponding photoconductor drums 101a to 101d. Electrostatic latent images in accordance with the image data pieces of the respective color phases of black, cyan, magenta, and yellow are formed on the corresponding photoconductor drums 101a to 101d. In the present embodiment, the exposure unit E is a laser scanning unit (LSU) having a laser irradiating section and the reflection mirror. However, instead of the LSU, the exposure unit E may be configured as an EL or LED writing head having light-emitting elements arranged in an array.

The photoconductor drum 101 is arranged above the exposure unit E. It is an image carrier having generally a cylindrical shape, and is controlled to rotate in a predetermined direction by unillustrated drive means and control means. The photoconductor drum 101 has a photoconductive layer formed on a base. For example, a metal drum made by aluminum or the like is used as the base, and on its outer peripheral surface, the photoconductive layer such as amorphous silicon (a-Si), selenium (Se) or organic semiconductor (OPC) is formed as a thin film. The structure of the photoconductor drum 101 is not limited to the above-mentioned structure.

The charging roller 103 is a contact type charging device for uniformly charging a surface of the photoconductor drum 101 with a predetermined potential. In the present embodiment, the contact type roller-type charging roller 103 is used as the charging device. However, instead of the charging roller 103, a charger type charging device, or a brush type charging device may be employed.

The developing device 102 supplies toner to the surface of the photoconductor drum 101 on which the electrostatic latent image is formed, so that the electrostatic latent image is developed to form a toner image. The respective developing devices 102a to 102d store toners of the color phases of black, cyan, magenta, and yellow for developing the electrostatic latent images of the respective color phases formed on the corresponding photoconductor drums 101a to 101d with the toners of the respective color phases of black, cyan, magenta, and yellow.

The cleaner unit 104 removes and collects the residual toner on the surface of the photoconductor drum 101 after the development and the image transfer.

The intermediate transfer belt 11 arranged above the photoconductor drum 101 is stretched between a drive roller 11a and a driven roller 11b so as to form a loop-like moving path. The intermediate transfer belt 11 has an outer peripheral surface facing the photoconductor drum 101d, photoconductor drum 101c, photoconductor drum 101b, and photoconductor drum 101a in this order. The primary transfer rollers 13a to 13d are arranged at the position opposite to the photoconductor drums 101a to 101d across the intermediate transfer belt 11. The positions where the transfer belt 11 is opposite to the respective photoconductor drums 101a to 101d are the primary transfer positions. The intermediate transfer belt 11 is formed endlessly by a film having a thickness of about 100 to 150 μm.

A primary transfer bias having a polarity reverse to the charged polarity of the toner is applied to the primary transfer rollers 13a to 13d by a constant voltage control in order to transfer the toner images carried on surfaces of the photoconductor drums 101a to 101d onto the intermediate transfer belt 11. With this application, the toner images of the respective color phases formed on the photoconductor drum 101 (101a to 101d) are transferred onto an outer peripheral surface of the intermediate transfer belt 11 as superimposed one by one, whereby a full-color toner image is formed on the outer peripheral surface of the intermediate transfer belt 11.

When the image data of only some of the color phases of yellow, magenta, cyan, and black is inputted, the formation of the electrostatic latent image and the toner image is performed at some photoconductors 101, of the four photoconductor drums 101a to 101d, corresponding to the color phases of the inputted image data. For example, during the black-and-white image formation, the electrostatic latent image and the toner image are formed only on the photoconductor drum 101a corresponding to the black phase, and only the black toner image is formed on the outer peripheral surface of the intermediate transfer belt 11.

Each of the primary transfer rollers 13a to 13d has a shaft made of a metal (e.g., stainless) having a diameter of 8 to 10 mm, and a conductive elastic member (e.g., EPDM, urethane foam, etc.) covering a surface of the shaft. A high voltage is uniformly applied to the intermediate transfer belt 11 due to the conductive elastic member. The primary transfer rollers 13a to 13d are used as the transfer electrode in the present embodiment, but a brush is usable instead of the primary transfer rollers.

The toner image transferred onto the outer peripheral surface of the intermediate transfer belt 11 at each of the primary transfer positions is transported to the secondary transfer position, where the toner image faces the secondary transfer roller 14, according to the rotation of the intermediate transfer belt 11. During the image formation, the secondary transfer roller 14 is in press contact with the outer peripheral surface of the intermediate transfer belt 11, whose inner peripheral surface is in contact with a peripheral surface of the drive roller 11a, with a predetermined nip pressure. Either one of the secondary transfer roller 14 and the drive roller 11a of the intermediate transfer belt is made of a hard material such as a metal, while the other is made of a soft material (elastic rubber roller or foaming resin) such as an elastic roller, in order to continuously obtain the nip pressure.

When the sheet fed from the sheet feeding cassette 16 or the manual sheet feeding tray 17 passes between the secondary transfer roller 14 and the intermediate transfer belt 11, a high voltage having a polarity (+) reverse to the charged polarity (−) of the toner is applied to the secondary transfer roller 14. In this way, the electrostatic latent image on each of the photoconductor drums 101 (101a to 101d) is made visible with the toner corresponding to the respective color phases to be the toner image. These toner images are superimposed on the intermediate transfer belt 11. Thereafter, the superimposed toner images move to the position where the transported sheet and the intermediate transfer belt 11 are in contact with each other, whereby the toner images are transferred onto the sheet from the outer peripheral surface of the intermediate transfer belt 11 by the secondary transfer roller 14 arranged at this position.

The toner adhered onto the intermediate transfer belt 11 due to the contact between the intermediate transfer belt 11 and the photoconductor drums 101 and the toners that are not transferred during the transfer of the toner images from the intermediate transfer belt 11 to the sheet, and therefore, remain onto the intermediate transfer belt 11 are removed and collected by the cleaner unit 12 of the intermediate transfer belt, because these toners cause a color mixture of toners in the subsequent step. The cleaner unit 12 of the intermediate transfer belt 11 includes, for example, a cleaning blade serving as a cleaning member that is brought into contact with the intermediate transfer belt 11. The intermediate transfer belt 11 has a portion with which the cleaning blade is brought into contact, the portion being supported by the driven roller 11b of the intermediate transfer belt from a backside thereof.

The sheet on which the toner image is transferred as the visible image is guided to the fuser 15 having a heat roller 15a and a pressure roller 15b, and passes between the heat roller 15a and the pressure roller 15b, with the result that the sheet is subject to the heat and pressure process. With this operation, the toner image, which is the visible image, is firmly fixed on a surface of the sheet. The sheet on which the toner image is fixed is discharged onto the sheet exit tray 18 by the exit roller 18a.

The color image forming apparatus 100 is provided with the generally vertical sheet transporting path P1 that transports the sheet stored in the sheet cassette 16 to the sheet exit tray 18 via a portion between the secondary transfer roller 14 and the intermediate transfer belt 11 and the fuser 15. The sheet transporting path P1 includes a pickup roller 16a that sends the sheet in the sheet cassette 16 to the sheet transporting path P1 one by one, a transporting roller r10 that transports the sent sheet facing upward, a registration roller 19 that guides the transported sheet between the secondary transfer roller 14 and the intermediate transfer belt 11 at a predetermined timing, and the exit roller 18a that discharges the sheet to the sheet exit tray 18.

The sheet transporting path P2 including a pickup roller 17a and a transporting roller r10 is formed in the color image forming apparatus 100 from the manual sheet feeding tray 17 to the registration roller 19. Further, the sheet transporting path P3 is formed from the exit roller 18a to an upstream side of the registration roller 19 in the sheet transporting path P1.

The exit roller 18a can rotate in both of the normal direction and reverse direction. During a one-side image formation in which an image is formed on one surface of a sheet, or during a formation of an image on a second surface in a double-side image formation in which an image is formed on both surfaces of the sheet, the exit roller 18a is rotated in the normal direction so as to discharge the sheet to the sheet exit tray 18. On the other hand, during a formation of an image on a first surface in the double-side image formation, the exit roller 18a is driven in the normal direction until the trailing end of the sheet passes the fuser 15, and then, driven in the reverse direction as nipping the trailing end of the sheet so as to guide the sheet into the sheet transporting path P3. With this operation, the sheet on which the image is formed on only one surface during the double-side image formation is guided to the sheet transporting path P1 with the front and back surfaces reversed and the leading and trailing ends reversed.

The registration roller 19 guides the sheet fed from the sheet cassette 16 or the manual sheet feeding tray 17 or the sheet transported through the sheet transporting path P3 to the portion between the secondary transfer roller 14 and the intermediate transfer belt 11 at the timing in synchronism with the rotation of the intermediate transfer belt 11. Therefore, the registration roller 19 stops its rotation when the photoconductor drums 101 and the intermediate transfer belt 11 are started to be operated, whereby the fed or transported sheet before the rotation of the intermediate transfer belt 11 is stopped in the sheet transporting path P1 with the leading end thereof being in contact with the registration roller 19. Thereafter, the registration roller 19 starts to rotate at the timing when the leading end of the sheet and the leading end of the toner image formed on the intermediate transfer belt 11 oppose to each other at the position where the secondary transfer roller 14 and the intermediate transfer belt 11 are in press contact with each other.

During the full-color image formation in which the image formation is performed for all of the image forming sections 55a to 55d, the primary transfer rollers 13a to 13d allow the intermediate transfer belt 11 to be in press contact with all of the photoconductor drums 101a to 101d. On the other hand, during the black-and-white image formation in which the image formation is performed for only the image forming section 55a, only the primary transfer roller 13a allows the intermediate transfer belt 11 to be in press contact with the photoconductor drum 101a.

<Electric Structure of Color Image Forming Apparatus>

Figure 2:
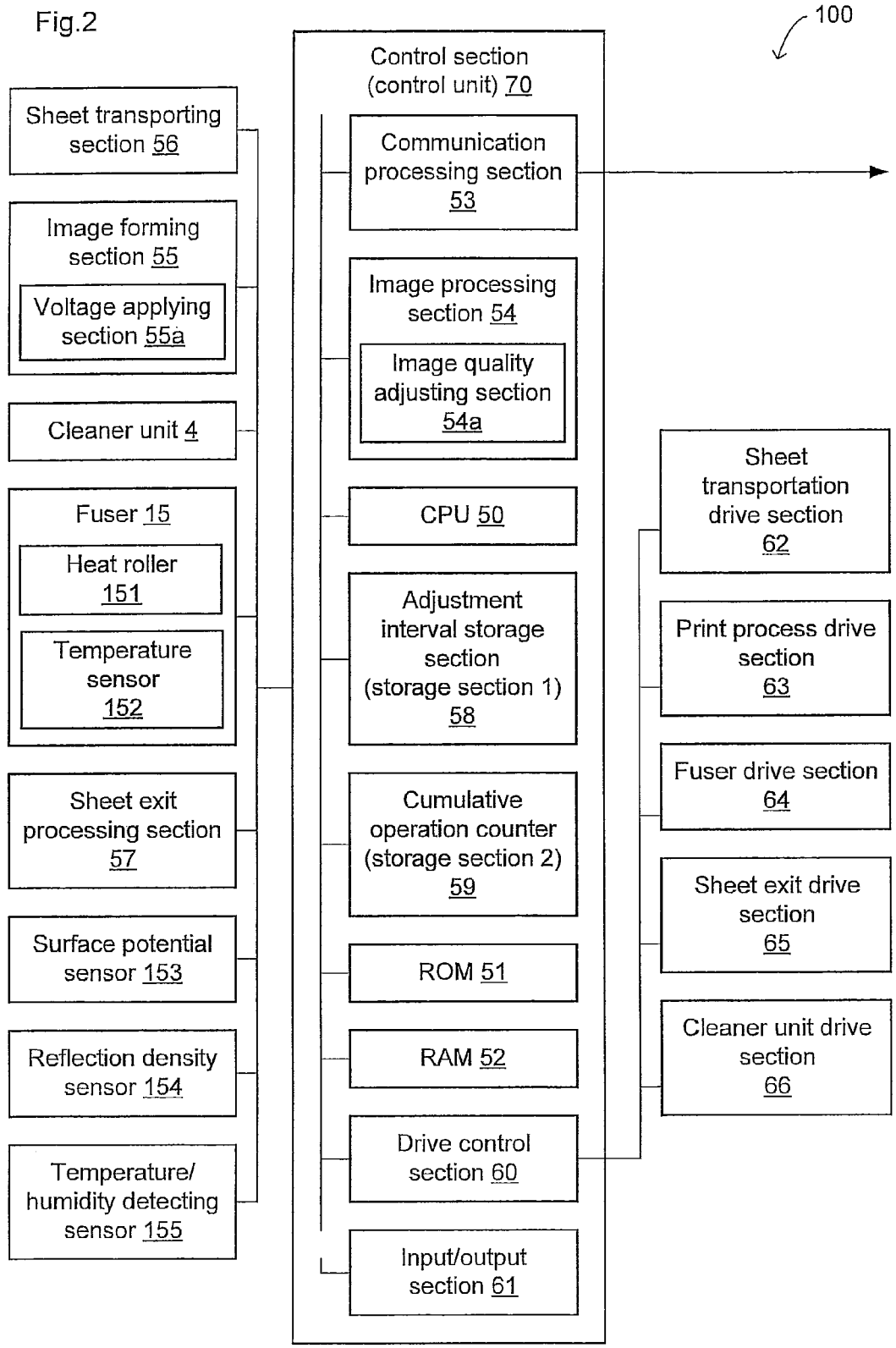
FIG. 2 is a block diagram schematically illustrating an electric structure of the color image forming apparatus according to the present invention.

Next, an electric structure of the color image forming apparatus according to the present embodiment will be described with reference to the drawings. FIG. 2 is a block diagram schematically illustrating the electric structure of the color image forming apparatus according to the present embodiment.

The control of the operation and the execution of processes are mainly executed by a control unit (control section) 70 including elements and circuits constituting a central processing unit (CPU) 50, a ROM 51, a RAM 52, a non-volatile memory that realizes a cumulative operation counter 59 and an adjustment interval storage section 58, a communication processing section 53, an image processing section 54, a drive control section 60, and an input/output section 61 in the color image forming apparatus 100 according to the present embodiment. The ROM (Read Only Memory) 51 stores a control program that indicates a procedure of the processes that the CPU 50 should execute. The RAM (Random Access Memory) 52 is used as temporary storage means when the CPU 50 executes the processes. The CPU 50 executes the processes in accordance with the procedure determined by the control program. The input/output section 61 is an input/output interface circuit between the control section 70 and an external block.

The control section 70 executes the processes, such as an image reading process, image process, image forming process, and transporting process of a recording medium (print sheet), or the like, as the color image forming apparatus 100. Storage means such as an HDD (Hard Disk Drive) can be used instead of some or all of the ROM 51 and the RAM 52.

In the color image forming apparatus 100, data of a print job is transmitted from an external terminal device that is connected via an unillustrated communication network, and this data is inputted to the RAM 52 through the communication processing section 53.

The image processing section 54 processes the document image information stored in the storage section of the RAM 52 into a print image, which is suitable for printing (image formation onto a sheet) according to the program described above. In the present embodiment, the image processing section 54 further includes an image quality adjusting section 54a, serving as image quality adjusting means, which corrects the change in the image quality of the output image, such as the change in the density of the printed image quality or the change in the tone.

The adjustment interval storage section 58 (first storage section) stores the rotating time (corresponding to the moving distance of a peripheral surface of the photoconductor) of each of the photoconductors or a number of printed pages, as the interval (the first to fourth periods in the present invention) for executing the adjustment of the image quality of a black-and-white image and a color image. The adjustment interval storage section 58 is provided on a non-volatile storage element, and it can change the stored value by a predetermined operation. For example, when a service engineer or a key operator carries out a predetermined operation according to the request of a user, the value stored in the adjustment interval storage section 58 can be changed.

The print image information to which the image process is done by the image processing section 54 is inputted to the image forming section 55. The image forming section 55 is operated with the sheet transporting section 56 that makes various detections and controls of the sheet in the sheet transporting paths P1 to P3, the fuser 15, the sheet exit processing section 57 that makes various detections and controls of the sheet at the exit roller 18a, and the drive control section 60 that controls the respective drive sections.

The sheet transported by the sheet transporting section 56 is subject to a print step in which the printing process of the image information in the image forming section 55 is executed, then, a fixing step executed at the fuser 15 to the sheet that has been subject to the printing process, and then, discharged onto the sheet exit tray 18 serving as a sheet exit section. In the present embodiment, the fuser 15 includes a heater 151 for adjusting the temperature on a surface of the heat roller 15a and a temperature detecting sensor 152 that detects the temperature of the fuser 15 including the heat roller 15a.

The color image forming apparatus 100 operates a sheet transportation drive section 62, a print process drive section 63, a fuser drive section 64, a sheet exit drive section 65, and a cleaner unit drive section 66, which are drive actuators for the sheet transporting section 56, the image forming section 55, the fuser 15, and the sheet exit processing section 57, in accordance with a set driving condition. Specifically, the synchronized operation in accordance with the instruction from the CPU 54 based on the program stored in the ROM 51 is performed by the control of the drive control section 60.

The sheet transportation drive section 62 is a drive motor for the sheet transporting section 56, specifically, the above-mentioned pickup rollers 16a and 17a, and the registration roller 19 on the sheet transporting paths P1 and P2. The print process drive section 63 is a drive motor for the photoconductor drum 101. The fuser drive section 64 is a drive motor for the heat roller 15a and the pressure roller 15b of the fuser 15. The sheet exit drive section 65 is a drive motor for the exit roller 18a or the like. The cleaner unit drive section 66 is a drive motor for a brush roller provided in the cleaner unit 104. The drive motors in the respective drive sections can be configured to have the same or different motors as a drive source through a power transmission mechanism.

The cumulative operation counter 59 (second storage section) that stores the cumulative operation distance of the photoconductor or the cumulative number of the print pages corresponding to the black-and-white image and the color image of the color image forming apparatus 100 is connected to the CPU 50. In the present embodiment, the CPU 50 controls the start of the adjustment of the image quality of the visible image by the image quality adjusting section 54a based on the comparison between the cumulative operation distance of the photoconductor for the black-and-white image, the cumulative operation distance of the photoconductor for the color image, or the cumulative number of print pages, which is counted by the cumulative operation counter 59, and the set operation distance of the photoconductor or the set number of print pages (first storage section) in the adjustment interval storage section 58.

<Control of Execution Timing of Image Adjusting Operation>

Figure 3:
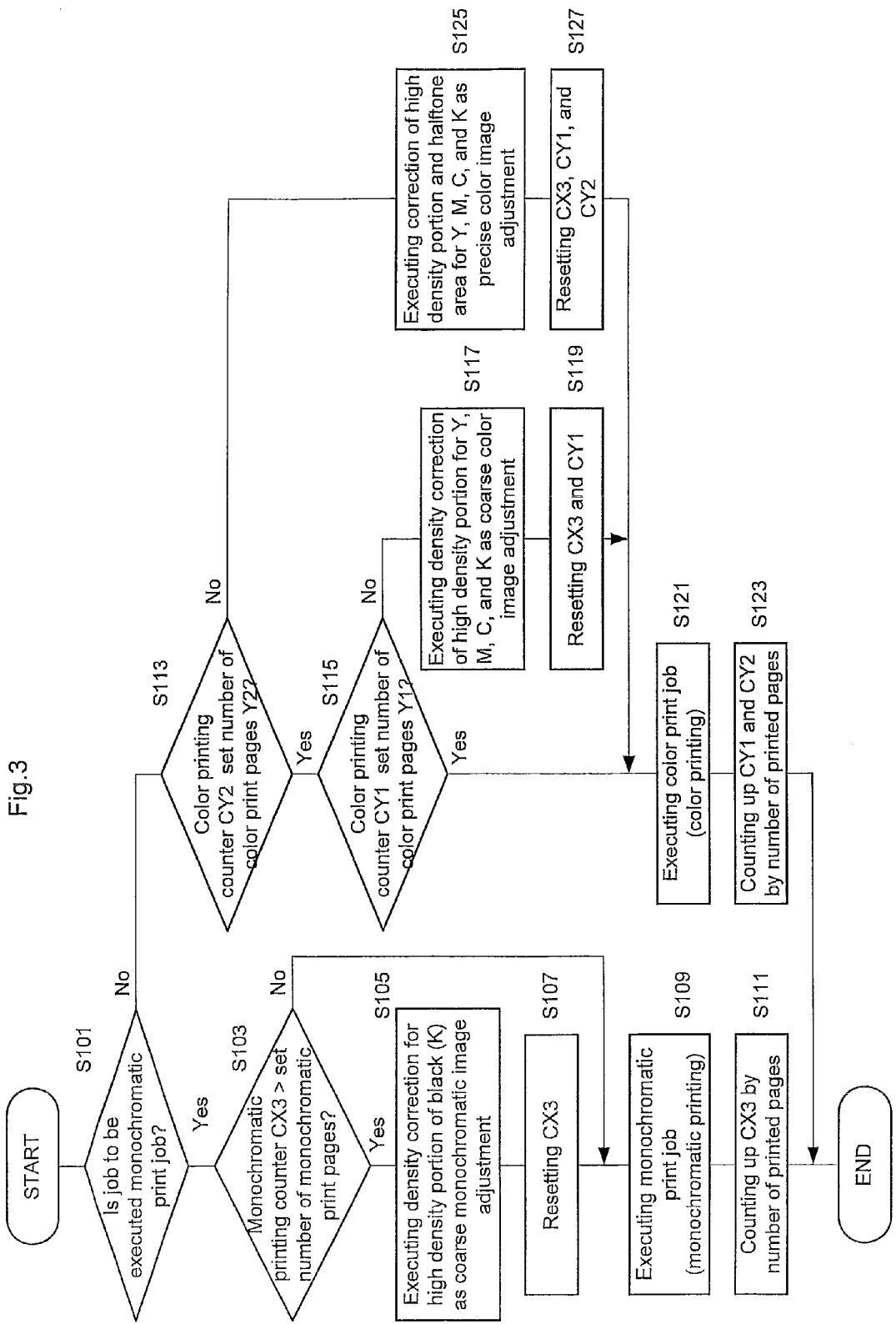
FIG. 3 is a flowchart for explaining an image adjusting operation of the color image forming apparatus according to the present invention.

Next, the image adjusting operation of the color image forming apparatus according to the present embodiment will schematically be described with reference to the drawings. FIG. 3 is a flowchart for explaining the image adjusting operation of the color image forming apparatus according to the present embodiment.

In the present embodiment, the cumulative operation counter 59 has a black-and-white printing counter CX3 and color printing counters CY1 and CY2. The black-and-white printing counter CX3 stores the cumulative number of pages of the black-and-white printing, while the color printing counters CY1 and CY2 store the cumulative number of pages of the color printing. The adjustment interval storage section 58 stores a set number of black-and-white print pages X3, and set numbers of color print pages Y1 and Y2. In the present embodiment, 1000 sheets are set for X3, 300 sheets are set for Y1, and 500 sheets are set for Y2.

When a print job is acquired, the CPU 50 serving as the determining section determines whether the print job is a black-and-white printing or a color printing (step S101). Specifically, it determines in accordance with the presence of chromatic pixels in a print document. When each page of the print job includes only the black-and-white printing, the CPU 50 determines that this job is a black-and-white print job (Yes in step S101). If otherwise, the CPU 50 determines that this job is a color print job. In the case of the black-and-white print job, the CPU 50 determines whether or not the cumulative number of black-and-white print pages stored in the black-and-white printing counter CX3 is greater than an image adjusting correction period X3 of the black-and-white image (step S103). If the value of the black-and-white printing counter CX3 is greater than the set number of black-and-white print pages X3 as a result of the determination (Yes in step S103), the CPU 50 serves as the control section to execute a coarse black-and-white image adjustment (step S105). In the present embodiment, the coarse black-and-white image adjustment is a high density correction. In the high density correction, the image forming condition involved with the black image forming section 55*a* is corrected in order that the density at the black high density portion becomes a predetermined density. The high density correction will be described later. The CPU 50 resets the black-and-white printing counter CX3 after the completion of the coarse black-and-white image adjustment (step S107). Then, the routine proceeds to step S109.

On the other hand, when the value of the black-and-white printing counter CX3 is not more than the image adjusting correction period X3 for the black-and-white image in step S103 (No in step S103), the routine proceeds to step S109 without performing the coarse black-and-white image adjustment.

The CPU 50 controls to cause the black image forming section 55*a* to form the image of the acquired black-and-white print job in step S109 (step S109). The CPU 50 also counts up the value of the black-and-white printing counter CX3 by the number of print pages of the formed black-and-white image (step S111).

When the acquired print job is a color print job in step S101 (No in step S101), the CPU 50 determines whether or not the cumulative number of color print pages stored in the color printing counter CY2 is greater than an image adjusting correction period Y2 of the color image (step S113). If the value of the color printing counter CY2 is greater than the set number of color print pages as a result of the determination (No in step S113), the routine proceeds to step S125. Then, the CPU 50 functions as the control section so as to execute the precise color image adjustment (step S125). In the present embodiment, the precise color image adjustment includes the former high density correction and the latter halftone density correction (halftone correction). In the high density correction, the image forming condition involved with the image forming sections 55 for the respective color components is corrected in order that the high density portions of Y, M, C, and K have a predetermined density. In the latter halftone correction, the gradation characteristic in the halftone area of Y, M, C, and K is corrected. In the coarse color image adjustment, the image forming condition involved with the image forming sections 55 for the respective color components is corrected in order that the high density portions of Y, M, C, and K have a predetermined density, wherein the adjustment for K is the same as the coarse black-and-white image adjustment in step S105. After the completion of the precise color image adjustment, the CPU 50 resets the color printing counters CY1 and CY2 and the black-and-white printing counter CX3 (step S127). Then, the routine proceeds to step S121.

On the other hand, if the value of the color printing counter CY2 is not more than the set number of color print pages in step S113 (Yes in step S113), the CPU 50 then determines whether or not the cumulative number of pages for the color printing stored in the color printing counter CY1 is greater than an image adjusting correction period Y1 for the color image (step S115). If the value of the color printing counter CY2 is greater than the set number of pages for the color printing Y2 (No in step S115), the CPU 50 functions as the control section so as to execute the coarse color image adjustment (step S117). In the coarse color image adjustment, the image forming condition involved with the image forming sections 55 for the respective color components is corrected in order that the high density portions of Y, M, C, and K have a predetermined density. This correction is the same as the former correction (high density correction) in the precise color image adjustment in step S125. After the completion of the coarse color image adjustment, the CPU 50 resets the color printing counter CY1 and the black-and-white printing counter CX3 (step S119), and then, the routine proceeds to step S121.

On the other hand, when the value of the color printing counter CY1 is not more than the set number of color print pages (Yes in step S115), the routine proceeds to step S121 without executing the color image adjustment.

The CPU 50 controls to cause the image forming section 55 to form the image of the acquired color print job in step S121. The CPU 50 also counts up the values of the color printing counters CY1 and CY2 by the number of print pages of the formed color image (step S123).

In the present embodiment, the number of print pages is defined as a reference of the determination. However, the same control can be performed with the operation time of the photoconductor, i.e., the rotating time of the photoconductor (corresponding to the operation distance of a peripheral surface of the photoconductor) defined as the reference of the determination. Alternatively, the other indexes, e.g., the operation time of the developing device, can be employed.

The image forming apparatus according to the present embodiment includes the temperature/humidity detecting sensor 155 for detecting the atmospheric temperature and humidity. The present invention may be configured such that the values of Y1, Y2, and X3 are corrected in accordance with the result of the detection of the temperature/humidity detecting sensor 155, and the corrected values are compared to the CY1, CY2, and CX3 so as to determine whether the respective image adjustments should be executed or not. For example, when the temperature and/or humidity is out of a predetermined range (ordinary temperature and ordinary humidity) in step S113, the value obtained by multiplying Y1 by a predetermined coefficient (e.g., 0.8) and the counter CY1 may be compared. With this structure, when the environment around the apparatus is not the ordinary temperature and ordinary humidity, the image adjustment can be executed with the interval shorter than that in the case of the ordinary temperature and ordinary humidity.

<Embodiment Including Precise Black-and-white Image Adjustment>

Figure 4:
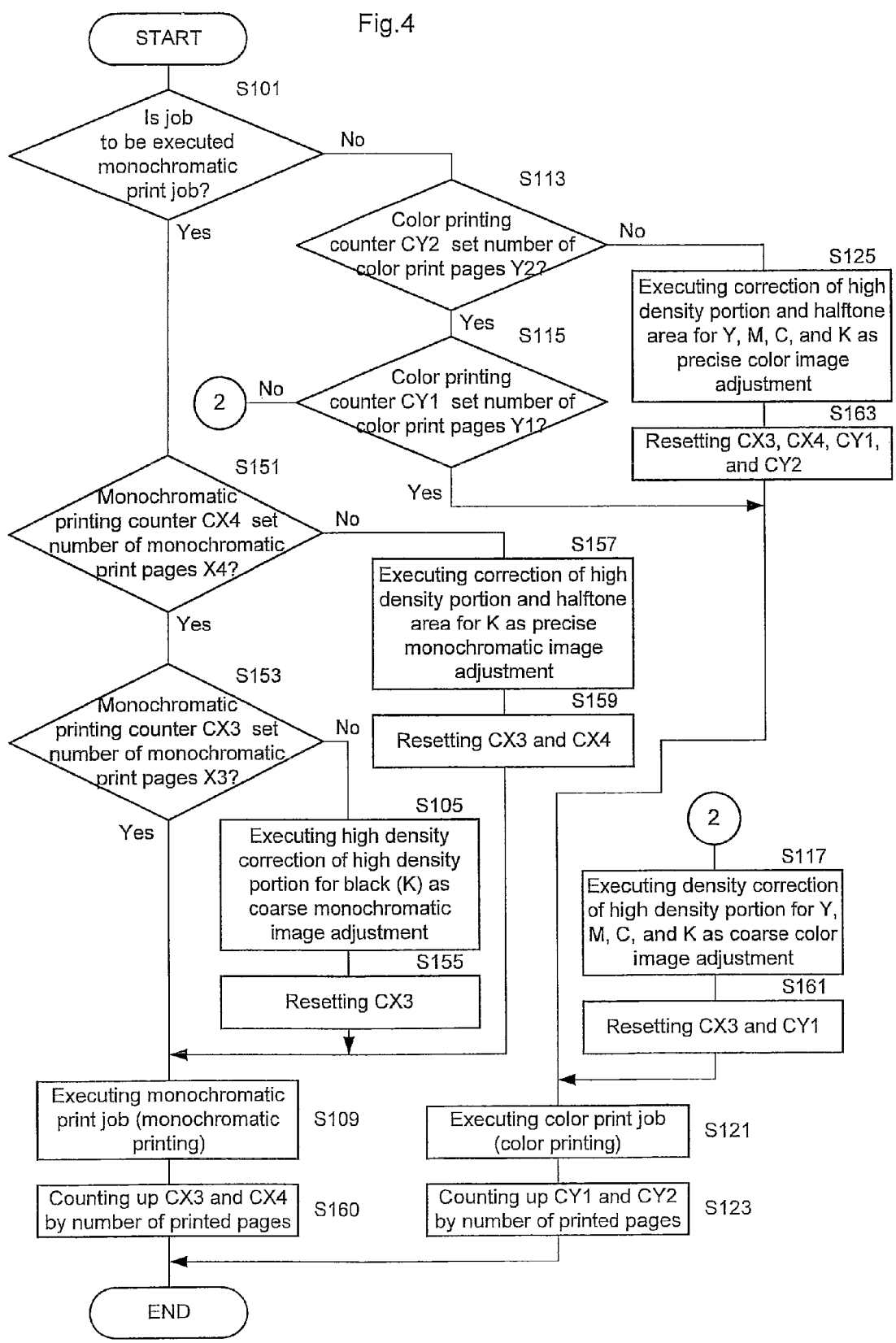
FIG. 4 is a flowchart illustrating a different embodiment in which the image adjusting operation in an image forming apparatus in the present invention.

The embodiment in which the precise image adjustment is performed for the black-and-white printing in addition to the image adjustment shown in FIG. 3 will be described. FIG. 4 is a flowchart showing the embodiment in which the image adjusting operation in the color image forming apparatus according to the present invention is different. The same numerals are given to the processes in FIG. 4 same as those in FIG. 3, and the explanation for these steps will not be repeated here. The step different from FIG. 3 is mainly step S101, which is the process when the print job is determined to be the black-and-white printing (in the case of Yes).

In this embodiment, the cumulative operation counter 59 has black-and-white printing counters CX3 and CX4 and color printing counters CY1 and CY2. The black-and-white printing counters CX3 and CX4 store the cumulative number of black-and-white print pages, while the color printing counters CY1 and CY2 store the cumulative number of color print pages. The adjustment interval storage section 58 stores set numbers of black-and-white print pages X3 and X4, and set numbers of color print pages Y1 and Y2. In the present embodiment, 1000 sheets are set for X3, 2000 sheets are set for X4, 300 sheets are set for Y1, and 500 sheets are set for Y2.

When the acquired print job is a black-and-white print job in step S101 (Yes in step S101), the CPU 50 determines whether or not the cumulative number of black-and-white print pages stored in the black-and-white printing counter CX4 is greater than an image adjusting correction period X4 of the black-and-white image (step S151). If the value of the black-and-white printing counter CX4 is greater than the set number of black-and-white print pages X4 as a result of the determination (No in step S151), the routine proceeds to step S157. Then, the CPU 50 serves as the control section to execute a precise black-and-white image adjustment. In the present embodiment, the precise black-and-white image adjustment includes a former high density correction and a latter halftone correction. These corrections are the same as the precise color image adjustment for K. The CPU 50 resets the black-and-white printing counters CX3 and CX4 after the completion of the precise black-and-white image adjustment (step S159). Then, the routine proceeds to step S109.

On the other hand, if the value of the black-and-white printing counter CX4 is not more than the set number of black-and-white print pages in step S151 (Yes in step S151), the CPU 50 then determines whether or not the cumulative number of black-and-white print pages stored in the black-and-white printing counter CX3 is greater than the image adjusting correction period X3 for the black-and-white image (step S153). If the value of the black-and-white printing counter CX3 is greater than the set number of black-and-white print pages X3 (No in step S153), the CPU 50 functions as the control section so as to execute the coarse black-and-white image adjustment (step S105). In the coarse black-and-white image adjustment, the image forming condition involved with the image forming sections for K is corrected in order that the high density portion of K has a predetermined density. This correction is the same as the former correction (high density correction) in the precise black-and-white image adjustment in step S157. After the completion of the coarse black-and-white image adjustment, the CPU 50 resets the black-and-white printing counter CX3 (step S155). Thereafter, the routine proceeds to step S109.

On the other hand, when the value of the black-and-white printing counter CX3 is not more than the set number of black-and-white print pages in step S153 (Yes in step S115), the routine proceeds to step S109 without executing the black-and-white image adjustment.

The CPU 50 controls to cause the black image forming section 55a to form the image of the acquired black-and-white print job in step S109. The CPU 50 also counts up the values of the black-and-white printing counters CX3 and CX4 by the number of print pages of the formed black-and-white image (step S160).

When the acquired print job is a color print job in step S101 (No in step S101), the CPU 50 determines whether or not the color image adjustment should be executed or not, like the case of FIG. 3. The CPU 50 executes or does not execute the correction based on the result of the determination, and then, controls to execute the color print job (step S121). If the precise color image adjustment is executed, the black-and-white printing counters CX3 and CX4 and the color printing counters CY1 and CY2 are reset (step S163). If the coarse color image adjustment is executed (step S117), the black-and-white printing counter CX3 and the color printing counter CY1 are reset (step S161).

<First and Third Corrections—Coarse Image Adjustment>

Next, the coarse image adjustment of the image adjusting operations will be described. The first correction in the present invention corresponds to the black-and-white coarse image adjustment, while the third correction in the present invention corresponds to the coarse color image adjustment.

Figure 5:
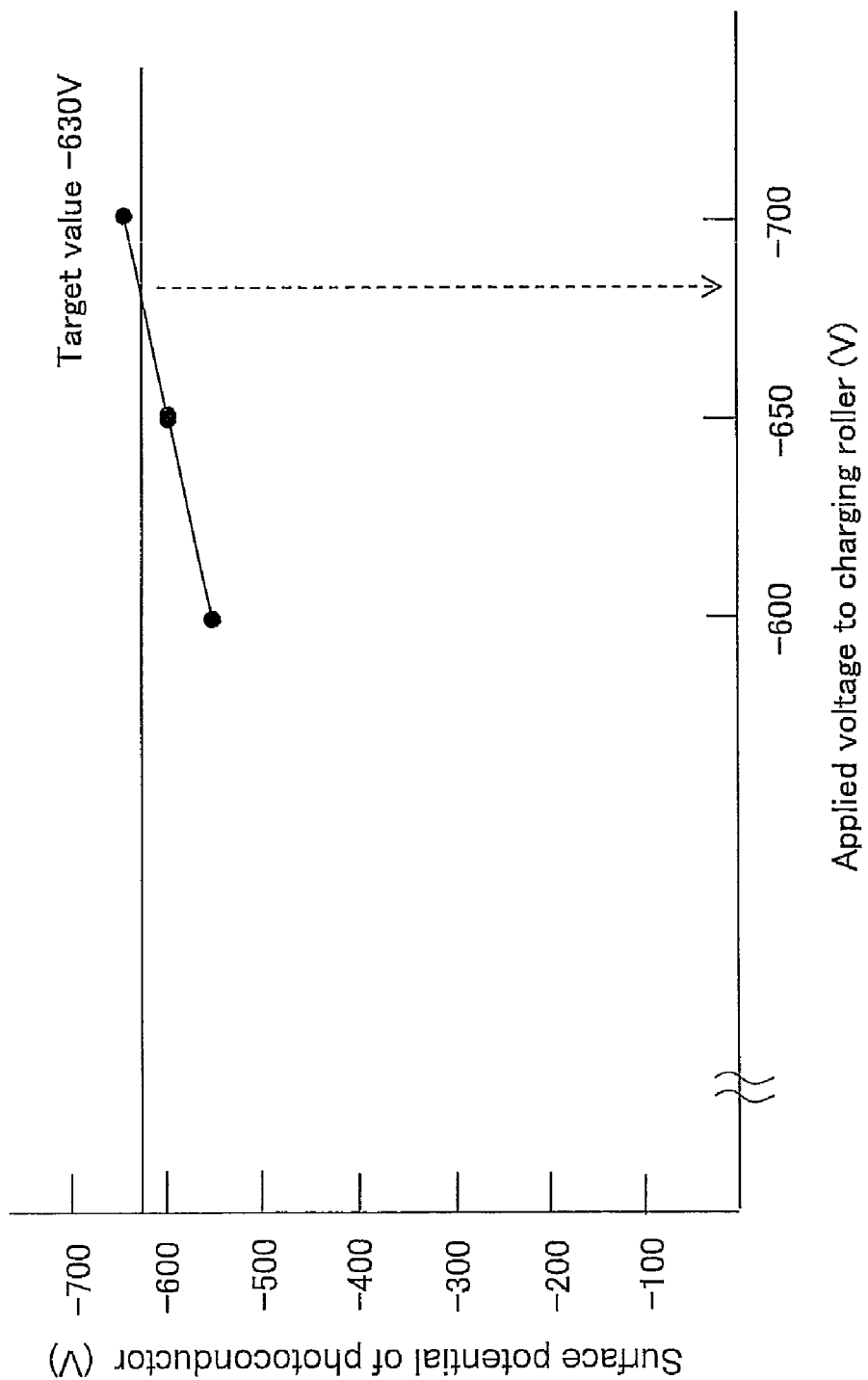
FIG. 5 is a view illustrating that a charging potential in a coarse image adjustment is secured according to the present invention.

A surface potential of the photoconductor can be changed by changing the voltage applied to the charging roller. As shown in FIG. 5, the greater the applied voltage becomes, the higher the surface potential becomes. Therefore, the surface potentials corresponding to −600 V, −650 V, which is the applied voltage upon the initialization, and −700 V are read by a surface potential sensor (not shown). The read data pieces are plotted so as to obtain the applied voltage to the charging roller necessary for obtaining a target surface potential −630 V. In the present embodiment it is about −680 V.

Accordingly, the image adjustment for determining a density of a solid image is the coarse image adjustment. In the color image forming apparatus according to the present embodiment, the coarse image adjustment can be executed in a relatively short period (about 10 seconds), whereby both of the black-and-white image adjustment and the color image adjustment are executed.

<Second and Fourth Correction—Precise Image Adjustment>

The precise image adjustment of the image adjusting operations will next be described.

Figure 6:
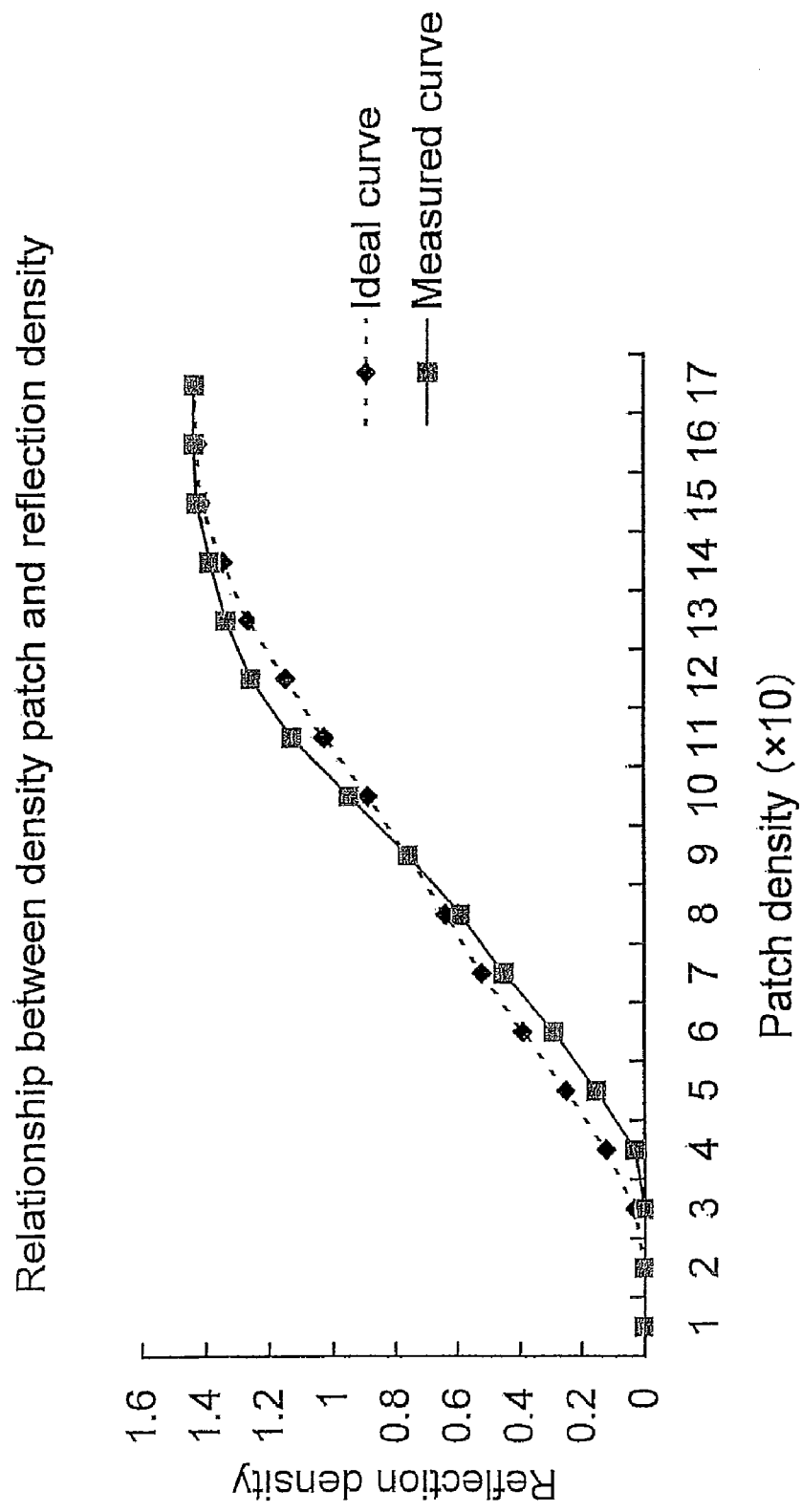
FIG. 6 is a view illustrating a result of a measurement in a precise image adjustment according to the present invention.

The precise image adjustment is performed for obtaining a target sensitivity curve (gamma characteristic) for an image of a halftone level after the density of the solid image is determined by the coarse image adjustment. Specifically, plural patch images, each having a different density, are formed on a photoconductor or on an intermediate transfer member based on the surface potential determined by the coarse image adjustment, then, the densities of the images are measured by a reflection density sensor (not shown), and the densities of the images (toner deposited amount) on the photoconductor for the density of each patch are plotted. FIG. 6 shows the specific example thereof. If the measured values (solid line) are shifted from the target sensitivity curve (broken line), the output value of a laser is finely adjusted so as to make the measured values close to the target curve. In the precise image adjustment according to the present embodiment, the number of the image patches is great, so that it takes time (about 60 seconds) to make a plot or to calculate from the output value.

There are various modifications of the present invention in addition to the above-mentioned embodiments. It should not be construed that the modifications do not belong to the scope of the present invention. The present invention should include the meaning equivalent to the claims and all modifications within the scope of the present invention.

For example, the present invention is described by using an electrophotographic digital full-color copying machine as the color image forming apparatus in the above-mentioned embodiments. However, the present invention is not limited to an electrophotographic/digital type, but the present invention is applicable to another image forming method such as an ink jet type, analog type, black-and-white or non-full-color limited color, printer, facsimile, or the like.

What is claimed is:

1. An image forming apparatus comprising:
   a job acquiring section for acquiring image data of one or more pages as a print job;
   a determining section for determining whether the acquired print job includes a black and white page only or a color page;
   a black image forming section for forming a black image in the black-and-white page and a black image in the color page, and selectively forming a first black pattern for a coarse correction of black or a second black pattern for a precise correction of black or forming both the first and second black patterns;
   a color image forming section for forming a color image which includes different color components of the color page but excludes a black component and selectively forming either a third color pattern for a coarse correction of color or a fourth color pattern for a precise correction of color;
   a measuring section for measuring the formed pattern including at least the first pattern; and
   a control section for allowing the black image forming section to selectively form at least the first black pattern or a second black pattern, allowing the color image forming section to selectively form either a third or a fourth color pattern, allowing the measuring section to measure the formed pattern including at least the first pattern, and selectively controlling to perform the coarse correction of black for correcting a forming condition of a black image to be formed in a black-and-white page or to perform a precise correction of black or both the coarse correction and the precise correction, the coarse and precise correction of color for correcting a forming condition of both black and color images to be formed in a color page based on the measurement of the formed pattern,
   wherein the control section controls to perform the coarse correction of black but not to perform the precise correction of black and the coarse and precise corrections of color in case a print job is acquired after a predetermined period referred as a first period elapses since the black image forming section has formed the first black pattern previously and the acquired print job includes a black-and-white page only.

2. The image forming apparatus according to claim 1, wherein
   the control section controls to selectively perform the coarse correction of black, the precise correction of black, the coarse correction of color or the precise correction of color, to correct density,
   the coarse correction of black being to correct a high density portion of the black image by forming and measuring the first black pattern,
   the precise correction of black being to correct a high density and halftone portion of the black image by forming and measuring the first and second black patterns,
   the coarse correction of color being to correct a high density portion of the color image by forming and measuring the third color pattern, and
   the precise correction of color being to correct a high density and halftone portion of the color image by forming and measuring the third and fourth color patterns.

3. The image forming apparatus according to claim 1, wherein
   the control section controls to perform the precise correction of black but not to perform the coarse correction of black and the coarse and precise corrections of color in case a print job is acquired after a predetermined second period elapses since the black image forming section has formed the second black pattern previously and the acquired print job includes a black-and-white page only, and
   the second period is a longer period than the first period.

4. The image forming apparatus according to claim 3, further comprising:
   a black correction interval changing section that changes a length of the first period or the second period or both the first and second periods.

5. The image forming apparatus according to claim 1, wherein
   the control section controls to perform the coarse correction of color but not to perform the coarse and precise corrections of black and the precise correction of color in case a print job is acquired after a predetermined third period elapses since the color image forming section has formed the third color pattern previously and the acquired print job includes a color page.

6. The image forming apparatus according to claim 5, wherein:
   the control section controls to perform the precise correction of color but not to perform the coarse and precise corrections of black and the coarse correction of color in case a print job is acquired after a predetermined fourth period elapses since the color image forming section has formed the fourth color pattern previously and the acquired print job includes a color page; and
   the fourth period is a longer period than the third period.

7. The image forming apparatus according to claim 6, further comprising:
   a color correction interval changing section that changes a length of the third period or the fourth period or both the third and fourth periods.

8. The image forming apparatus according to claim 1, wherein
   the first period is determined based on an operation time of a corresponding photoconductor, or based on a cumulative number of black-and-white pages.

9. An image forming method comprising the steps of:
   acquiring image data of one or more pages as a print job by a job acquiring section;
   determining, by a determining section, whether the acquired print job include a black and white only or a color page;
   forming a black image in the black-and-white page and a black image in the color page by a black image forming section;
   forming a color image which includes different color components of the color page but excludes a black component by a color image forming section;
   selectively forming a first black pattern for a coarse correction of black or a second black pattern for a precise correction of black or forming both the first and second black patterns by the black image forming section;
   selectively forming either a third color pattern for a coarse correction of color or a fourth color pattern for a precise correction of color by the color image forming section;
   measuring the formed pattern including at least the first pattern by a measuring section;

correcting a forming condition of the black image and respective color components of the color image by a control section; and controlling to perform the coarse correction of black for correcting a forming condition of a black image to be formed in a black-and-white page and to selectively perform either a precise correction of black or a coarse correction of black or both the coarse correction and the precise correction, the coarse and precise correction of color for correcting a forming condition of both black and color images to be formed in a color page based on the measurement of the formed pattern, wherein the step of controlling is a step of performing the coarse correction of black but not performing the precise correction of black and the coarse and precise corrections of color in case a print job is acquired after a predetermined period referred as a first period elapses since the black image forming section has formed the first black pattern previously and the acquired print job includes a black-and-white page only.

* * * * *